United States Patent [19] [11] 3,998,401
Fink [45] Dec. 21, 1976

[54] TAPE REEL WITH TAPE-ATTACHING MECHANISM

[76] Inventor: Richard R. Fink, 31 Kinnan Way, Basking Ridge, N.J. 07920

[22] Filed: Oct. 1, 1975

[21] Appl. No.: 618,481

[52] U.S. Cl. .............................................. 242/74.1
[51] Int. Cl.² ....................................... B65H 75/28
[58] Field of Search ................... 242/74, 74.1, 74.2

[56] References Cited

UNITED STATES PATENTS

| | | | |
|---|---|---|---|
| 2,859,920 | 11/1958 | Flahan | 242/74.1 |
| 2,948,487 | 8/1960 | Locklin | 242/74.2 |
| 3,326,483 | 6/1967 | Ivans | 242/74 |
| 3,347,486 | 10/1967 | Martin | 242/74.2 |
| 3,544,028 | 12/1970 | Wangerin | 242/74.1 |
| 3,545,697 | 12/1970 | Sovia | 242/74.1 |

Primary Examiner—Edward J. McCarthy
Attorney, Agent, or Firm—William T. Hough

[57] ABSTRACT

In a preferred embodiment of the invention, a tape reel has a hub tape-anchoring mechanism defined by the structure thereof, preferably defining a slit of which one side face of the slit is a friction-engaging surface against which a tape end becomes pressed to be thereby clamped against withdrawal from the slit, and of which a second side face of the slit is composed of a to and fro advanceable and retractable friction face of a wedge element slidably movable along axially an elongated axis thereof at a slit-intersecting angle defined between the elongated axis and the distal anchored end of the tape with the result that the wedge element, lightly spring-biased against the tape face, becomes increasingly clamped thereagainst when the reel rotates in a normally forward direction, the slit having its elongated axis extending substantially radially and tangentially inwardly from a circumscribing periphery of the hub structure at an angle that intersects a radius at a radially inward acute angle, by which relative to a tangential linear line touching a periphery of the hub structure and perpendicular to the radius the slit forms an obtuse angle from a forward mouth edge of the slit adjacent the one-side of the slit and forms an acute angle from a rear mouth edge of the slit adjacent the wedge-face edge of the slit, with the wedge element protruding beyond a point of clamping and a point to which the rear mouth edge of the slit is recessed to result in an automatic release of the clamped tape end when the tape reel rotates in a direction of movement of the rear mouth edge to a point of location of the forward mouth edge upon and after an unwinding of the last wound loop around the hub structure.

9 Claims, 6 Drawing Figures

TAPE REEL WITH TAPE-ATTACHING MECHANISM

This invention relates to a novel tape reel by which the fastening and release controllably of a tape end is facilitated.

BACKGROUND TO THE INVENTION

Prior to the present invention, various means have been devised for the fastening of a tape end to a tape reel hub, but none heretofore have been adequate for quick and reliable attachment of the tape end, nor for a combination of good clamping action together with a facility for rapid and ready release, nor for a clamping secure against withdrawal of the tape upon application of too strong a pulling torque as the reel begins to windup the tape on the winding of the first loop, nor any mechanism for release automatically from an anchored state when during rewind the reel turns rotatably beyond the anchoring point after having unwound the last tape loop with the result often of tearing off the tape end and/or causing undue and destructive stress on the rewind mechanism of the tape recorder or player mechanism.

SUMMARY OF THE INVENTION

Accordingly, objects of the present invention include the overcoming and/or avoiding of problems of the types discussed above, together with other novel advantages.

Another object is to obtain a tape reel having a manually releasable anchoring mechanism for a tape end, in which the clamping torque is easily initially applied in the initial clamping maneuver by manual adjustment.

Another object is to obtain a tape reel having a tape anchoring mechanism in which the clamping torque is increased relative directly to the degree of withdrawal torque.

Another object is to obtain a tape reel having a tape anchoring mechanism in which a tape end is automatically released upon an unwinding of a last loop around the reel hub structure.

Another object is to obtain a tape reel having a tape anchoring mechanism by which the tape-end clamping torque is manually easily adjustable.

Other objects become apparent from the preceding and following disclosure.

One or more objects are obtained by the invention defined herein.

Broadly the invention may be defined as a reel structure for tape, or a player type and/or recorder type for music and/or voice and/or for video-type, or the like, in which the tape is at one end thereof anchored within a hub tape-anchoring slit; the present invention includes such a slit defined within the hub structure of the reel with the slit extending substantially radially inwardly and tangentially, as a tangent line extending along a longitudinal elongated axis of the slit, with a forward wall of the slit having a slit face providing a first friction surface against which a tape end when pressed is anchored, and having a second friction surface opposite the first friction surface, the second friction surface being a forward face of a wedge element which in a clamping state is lightly, i.e. at low pressure, preferably pressed into contact with a tape face of a tape end located between the two friction surfaces. The wedge element is positioned movably within a hub space defined within and by the hub structure, such that there preferably is a predetermined lever-action thereof to result in an increasing degree of clamping torque substantially directly proportional to withdrawal torque applied to the tape end as the tape reel begins to windup the first loop of tape around the hub structure of the reel.

In one preferred embodiment, the wedge element is an elongated slide element having a forward face providing a large surface area for engagement against a tape end, with the slide element along its longitudinal normally elongated axis slidable axially thereof along an axis intersecting the slit-elongated axis at an acute angle defined radially inwardly of the two intersecting axis one with the other. Also in this embodiment, the wedge's elongated axis, relative to a tangent line perpendicular to a hub radius, defines from a forward slit-mouth edge an obtuse angle preferably ranging from about 99° to 102°, with a complementary angle being defined on the rear mouth edge of the slit at an angle of preferably from about 81° to about 78°. In like manner, in this preferred embodiment, the slit extends along its elongated axis, relative to a line perpendicular to a radius at the mouth of the slit, at an acute angle more or less the same number of degrees as above-noted, with the positioning of the slit being such that when measured at a point where the slit elongated axis is perpendicular to and at that point intersects a radius of the hub structure (of circular configuration) the distance from the point of intersection on the radius line to the center of rotation point of the hub structure is typically 20 percent of the length of the hub-structure radius, ranging from zero percent up to typically 25 percent, the greater the percentage, the greater the clamping power. In like manner, for the wedge element, the smaller the angle of incidence of the acute angle, the greater the clamping torque upon the tape end as withdrawal torque is applied to the tape. In this embodiment, there preferably is a spring-biasing element biasing the wedge element into a contacting position and state-of-being, with a face of a tape end to be secured by clamping action, the spring not being a primary clamping force, of its own torque contribution, but the primary function of the spring element being to sufficiently push the wedge element's (second) friction surface against the tape face to an extent necessary for the tape surface to frictionally engage the friction surface to thereby pull the wedge element into a tighter clamping action against the other (first) friction surface. For manual release, there is provided an elongated slot in a hub-structure sheet structure above the wedge element, with a wedge element handle extending therethrough for grasping with the fingers of a person. Preferably the handle has a round, preferably cylindrical, base extending axially to an off-set handle thereof with the base mounted rotatably within the wedge element such that the handle is eccentric to the base and by rotation to a predetermined point the base is positioned such that the handle distance from a forward end of the wedge is altered, thereby altering also the distance of the handle from the forward end of the slot in the hub-structure sheet, with the result that postive pressure of the wedge element's (second) friction surface against the (first) friction surface may be adjusted to greater or greater clamping torque in the securing of a tape end in an anchored state.

In an alternate other embodiment, the wedge element is in the form of a lever pivoted at one edge and the far edge being rotatable against a tape as a (second)

friction surface for the clamping of a tape end between opposing friction surfaces. Preferably there is a spring-biasing action and torque applied by a spring element in a direction upon the lever as to bring the far-edge friction surface into engagement with a tape end positioned between it and the other (first) friction surface of the slit. While one embodiment is substantially cylindrical, pivoted on its eccentric handle, in another embodiment, the lever is elongated with the elongated axis thereof being pivotal around a pivot pin with preferably a handle mounted in the far end side of the lever, with the handle extending through an arcuate slot in a hub-structure sheet structure above the wedge element.

In a still other embodiment, the lever is releasable of the tape by pressing together of a clothes-pin handle structure to thereby open apart claws of the clothes-pin structure to release tape anchored therebetween, after first withdrawing the lever (clothes-pin structure) from a lever-receiving space continuous with a radially inward end of a slit receivable of the tape end to be anchored.

The invention may be better understood by making reference to the following Figures.

THE FIGURES

DETAILED DESCRIPTION OF THE INVENTION

Figures 1, 4:
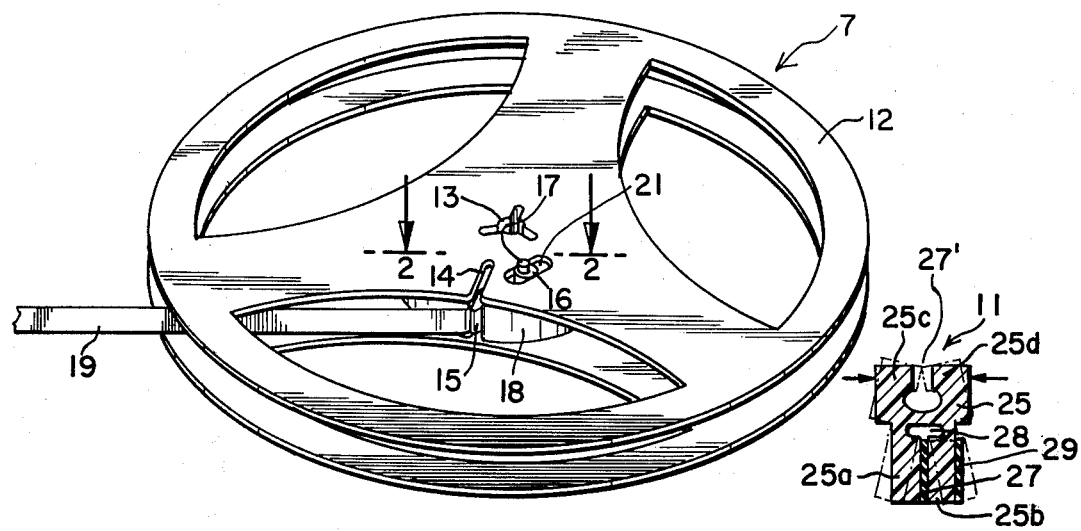
FIG. 1 illustrates in side perspective view, a tape reel of a preferred embodiment of the invention.
FIG. 4 illustrates in side cross-sectional view, the clothes-pin-like lever which is shown in the inserted state in the FIG. 3 embodiment.
Figures 2, 3:
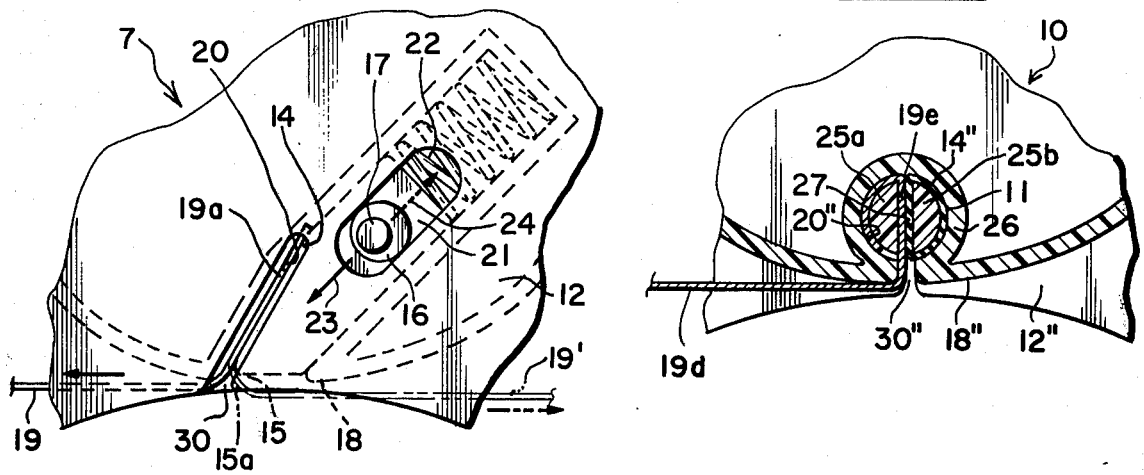
FIG. 2 illustrates in side elevation view, an in-part view of the FIG. 1 embodiment, as taken along lines 2—2 of FIG. 1.
FIG. 3 illustrates in side cross-section view an in-part view comparable to that of FIG. 2, of an alternate embodiment of the invention.
Figures 5, 6:
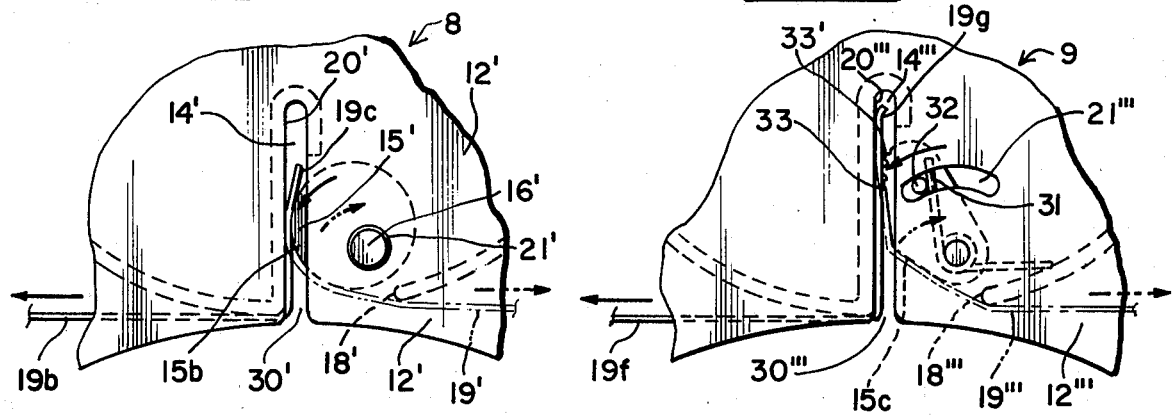
FIG. 5 illustrates an alternate embodiment of the invention, in a side in-part view.
FIG. 6 illustrates a further alternate embodiment of the invention, shown in a side in-part view.

In greater detail, FIGS. 1 and 2 illustrate a common preferred embodiment 7 of the inventive tape reel, FIGS. 3 and 4 illustrating another embodiment 10, and FIG. 5 illustrating another embodiment 8, and FIG. 6 illustrating another embodiment 9. In the FIG. 3 embodiment, FIG. 4 illustrates the wedge element 11 which is a clothes-pin like structure.

Since the embodiments 7, 8, 9 and 10 have many basic parts similar to one-another or identical, corresponding numerals are utilized such as for corresponding elements as the reel and hub sheet structure 12, 12', 12'', and 12''', for example.

In the FIGS. 1 and 2, there is shown the central aperture of the reel, as with any conventional reel typically, the aperture not being illustrated for the other embodiments since such is conventional. Each embodiment has a slit space such as 14, 14', 14'' and 14''', with a slit mouth such as 30, 30', 30'' and 30'''. For the embodiments, the typical tapes 19, 19b, 19d and 19f have tape end portions 19a, 19c, 19e and 19g clamped against the first friction surfaces 20, 20', 20'', and 20'''. The wedge elements 15, 15', 11 of embodiment of FIGS. 3 and 4, and 33 of FIG. 6 embodiment in a clamped state press against the first friction surfaces, the forwardly pressed surface of the respective wedge elements being the second friction surfaces. The first friction surface has a slight step radially inwardly of the clamping point thereon, thereby providing a seating friction surface into which the second friction surface is pressed forwardly for the FIGS. 1 and 2 embodiment 7.

Further for the FIGS. 1 and 2 embodiment 7, the handle element includes a cylindrical base 16 having an eccentric handle thereto, with the base 16 mounted within a cylindrical space defined within the wedge upper side for wedge element 15, with the handle 17 extending upwardly and riding within the elongated slot 21. Spiral spring 22, for example, biases the wedge element 15 axially in direction 23 but by use of a persons fingers is movable by the handle 17 in direction 24.

Embodiments 8 and 9 have corresponding handle apertures 21' and 21'''.

In embodiment 9, the handle 32 mounted in the wedge element 33, extends through and rides along slot 21''', the biasing spring 31 being visible through the slot 21'''. In this embodiment, the friction surface (second) 33' is roughed or serrated for improved grasping function.

In each of the embodiments 7, 8, and 9, the slit mouths 30, 30', and 30''' respectively have forward slit mouth edges against which the tapes 19, 19b and 19f pull, and spaced therefrom in a recessed state are the rear mouth edges 18, 18' and 18''' of the slit mouths.

The respective wedge elements 15, 15' and 15''' of embodiments 7, 8 and 9 have protruding portions 15a, 15b, and 15c respectively relative to straight imaginary lines extending between the clamping points of the wedge elements and the recessed rear mouth edges 18, 18' and 18''' respectively such that when the reel winds in a rewind clockwise direction beyond the point of unwinding the last stored tape loop, the tape becomes taut in direction 19' of FIGS. 1 and 2, of direction 19' tape for the embodiment 8 and of direction 19''' for embodiment 9, such that the tapes 19, 19', and 19''' respectively when taut cause a counter-pressure against the respective wedge elements 15, 15' and 33 causing the same to move retractably from the clamping position to thereby bring about release of the tape end portion.

In the embodiment 10 of FIGS. 3 and 4, the wedge element or lever 11 is in this embodiment a cylindrical structure having a lower through-slit or slot, as slot 27, and an upper slot 27' with the slot 27 being very narrow and the slot 27' being wide, the upper part of the structure having wider portions preferably squared or stepped as shown in FIG. 4, and mounted on one of the half-cylinders is a rubber or plastic coating 29 providing a non-slipping (preferably) and preferably elastic, or resilient, such that the clothes-pin structure may be opened easily for receiving a tape end portion to be slipped between the clamps 25a and 25b, preferably there being a space 28 allowing the clamps ample and easy spring or flexing action when the handle levers 25c and 25d of handle 25 are pressed together to open the slot 27 to a wider spread. After the wedge element 11 has the tape secured within the slot 27, the wedge 11 is then pressed into the seating aperture space 14'' wedging the tape end portion against the first friction surface 20''.

In the embodiment 7, manual movement of the handle 17 moves the wedge element 15 in direction 24 to release manually the tape 19. To release manually the tape 19b of embodiment 8, the handle 16' is manually rotated in a clockwise direction to bring about release.

In the embodiment 9, the handle 32 is manually moved to the right against the spring biasing torque of spring 31, in order to release the tape 19f.

It is within the scope of the invention to make such variations and modifications and substitution of equivalents as would be apparent to a person of ordinary skill.

I claim:

1. A reel tape securing device comprising in combination: a tape reel means for winding and storing tape thereon and for securely anchoring releasably an inner end of stored tape, said tape reel means including an inner hub structure defining a substantially open-ended radially inwardly-extending slit opening in a radially-outward face of the inner hub, and the inner hub structure including a fixed first friction surface forming at least a part of said slit and being adapted to frictionally engage and retain tape pressed thereagainst, and the tape reel means further including a lever means opposite said first friction surface, for imparting a predetermined mechanical advantage and torque in a clamping action against said first friction surface and adapted such that a tape placed between the lever means and the first friction surface is intermittently and releasably retainable, the lever means further including a handle element mounted movably of the lever means within hub inner space defined by the inner hub structure, said lever means including a wedge element having a second friction surface positioned in opposing relationship to said first friction surface, the wedge element being mounted within said inner hub's inner space at a position permitting wedging movement of the second friction surface in a wedging direction radially outwardly with an axis of said wedging movement defining an acute angle between the direction of wedging movement and the first friction surface, thereby adapted such that clamping torque of the second friction surface against said first friction surface increases when a tape end engaged clampingly is subjected to a withdrawal force resulting from a rotary movement of the inner hub structure in a forward take-up predetermined direction, and the handle element being movable of the wedge element intermittently in an opposite non-wedging direction moving the second friction surface away from the friction surface, thereby the handle being releasable of said torque otherwise clampingly present against the first friction surface when the withdrawal force is placed upon the tape end.

2. A reel tape securing device of claim 1, in which a substantially radially outwardly end portion of said second frictional surface nearest an outlet of said slit, includes a predetermined protruding portion protruding between a predetermined point of clamping against the tape end and a rear edge hub structure of said slit adjacent an outlet of the slit in which the rear edge hub structure is spaced a predetermined distance from a forward edge hub structure of said slit, adapted such that an imaginary linear line between said predetermined point of clamping and said rear edge hub structure cuts through said predetermined portion protruding beyond said predetermined point, the predetermined point being located radially inwardly along the first friction surface at a position where said imaginary linear line cuts through said predetermined portion adjusted and adapted such that when said hub rotates after unwinding a last loop of stored tape to rotate the slit beyond a point of take-up storage to a point that withdrawal is force placed on the clamped tape end, tape becomes pressed against each of said rear edge hub structure and said protruding portion to thereby cause the predetermined mechanical advantage and torque to become overcome resulting in a releasing of the tape end from a clamped state as said second friction surface is thus pressed away from the first friction surface.

3. A reel tape securing device of claim 2, in which relative to a circumscribing periphery to said hub structure, for an imaginary tangent line tangential to the circumscribing periphery and substantially perpendicular to a radius of the hub structure and extending through said forward edge hub structure, said slit along its elongated length defines an obtuse angle on a side of the slit adjacent the forward edge hub structure and defines an acute angle on a side of the slit adjacent the rear edge hub structure, said first friction surface extending from said forward edge hub structure adapted such that the second friction surface when placed in contact with said tape end, becomes clampably pulled tightly against the tape end clamped thereby between the first and second friction surfaces when the hub structure is under a torque or movement in said forward take-up predetermined direction, said forward take-up predetermined direction being movement fo the hub structure in a direction whereby the forward edge hub structure moves toward a point occupied by the rear edge hub structure.

4. A reel tape securing device of claim 3, in which said wedge element is an elongated element slidable axially to and fro, the hub structure defining a slide space along predetermined linear line intersecting said slit and said first friction surface.

5. A reel tape securing device of claim 4, in which said lever means further includes a spring element mounted between said wedge element and said hub structure adapted to bias said wedge element along said predetermined linear line toward said first friction surface.

6. A reel tape securing device of claim 2, in which said wedge element is a cylindrical element and in which the handle element is mounted on the wedge element to extend axially to the cylindrical element from an end thereof eccentrically, and in which said hub structure further defines a sheet structure above said hub inner space with an aperture therein mounting the handle element extending rotatably therethrough, adapted such that the cylindrical element eccentrically pivots clampably toward said first friction surface, said second friction surface being a cylindrical circumscribing surface of the cylindrical element.

7. A reel tape securing device of claim 2, in which said wedge element is an elongated lever pivoted at a proximal end thereof by pivot structure mounted on the inner hub structure within the hub inner space at a point substantially in juxtaposition to a radially outward surface of the inner hub structure adapted such that the elongated lever pivots in a clamping direction substantially radially outwardly toward said forward edge hub structure, the lever means including a spring mounted between the inner hub structure and the elongated lever adapted to bias said elongated lever pivotably toward said first friction surface, said second friction surface being located at a distal end portion of the elongated lever.

8. A reel tape securing device of claim 5, in which said wedge element in an upper surface thereof has surface structure defining a circular aperture, and the handle element includes a circular insert rotatably seatable within the circular aperture, and the handle element further includes, relative to an axis of rotation of the circular insert, an axially extending handle structure eccentric to a central axis of the circular insert, and the inner hub structure further defines an upper sheet structure above the slide space having a through-slot therein extending axially along a length of the slide space and of lesser width and lesser length than the slide space, rotating adjustment of the position of the handle structure being rotatable of the circular insert to a predetermined distance closer to or further away from said slit, and said spring biasing the handle structure against an end structure of the through-slot nearest the slit, distance of slide travel of the elongated element being thereby limited.

9. A reel tape securing device comprising in combination: a tape reel means for winding and storing tape thereon and for securely anchoring releasably an inner end of stored tape, said tape reel means including an inner hub structure defining a substantially open-ended radially inwardly-extending slit opening in a radially-outwardly face of the inner hub structure, and the inner hub structure including a fixed first friction surface forming at least a part of said slit and being adapted to frictionally engage and retain tape pressed thereagainst, and the tape reel means further including a lever means opposite said first friction surface, for imparting a predetermined mechanical advantage and torque in a spring-biased clamping action against said first friction surface and adapted such that a tape placed between the lever means and the first friction surface is intermittently and releasably retainable, the lever means further including a handle element mounted movably of the lever means within the hub inner space definged by the inner hub structure, the handle element being movable of the lever means in a non-clamping direction thereby releasable of said torque otherwise present against said first friction surface, said lever means being of substantially cylindrical shape having an axially extending slot extending through opposite cylindrical surfaces at one end and having an opposing slot spaced from the axially extending slot and the opposing slot extending from an opposite end cleaving the opposite end into opposing handles pressable together to thereby spread-apart opposing faces of the axially extending slot, and the hub structure defining an inner portion of the slit as an enlarged aperture of a size and shape adapted to receivably and removably seat said cylindrically shaped opposite cylindrical surfaces when the tape end is clamped within said axially extending slot, whereby said tape end may be anchored within the slit.

\* \* \* \* \*